UNITED STATES PATENT OFFICE.

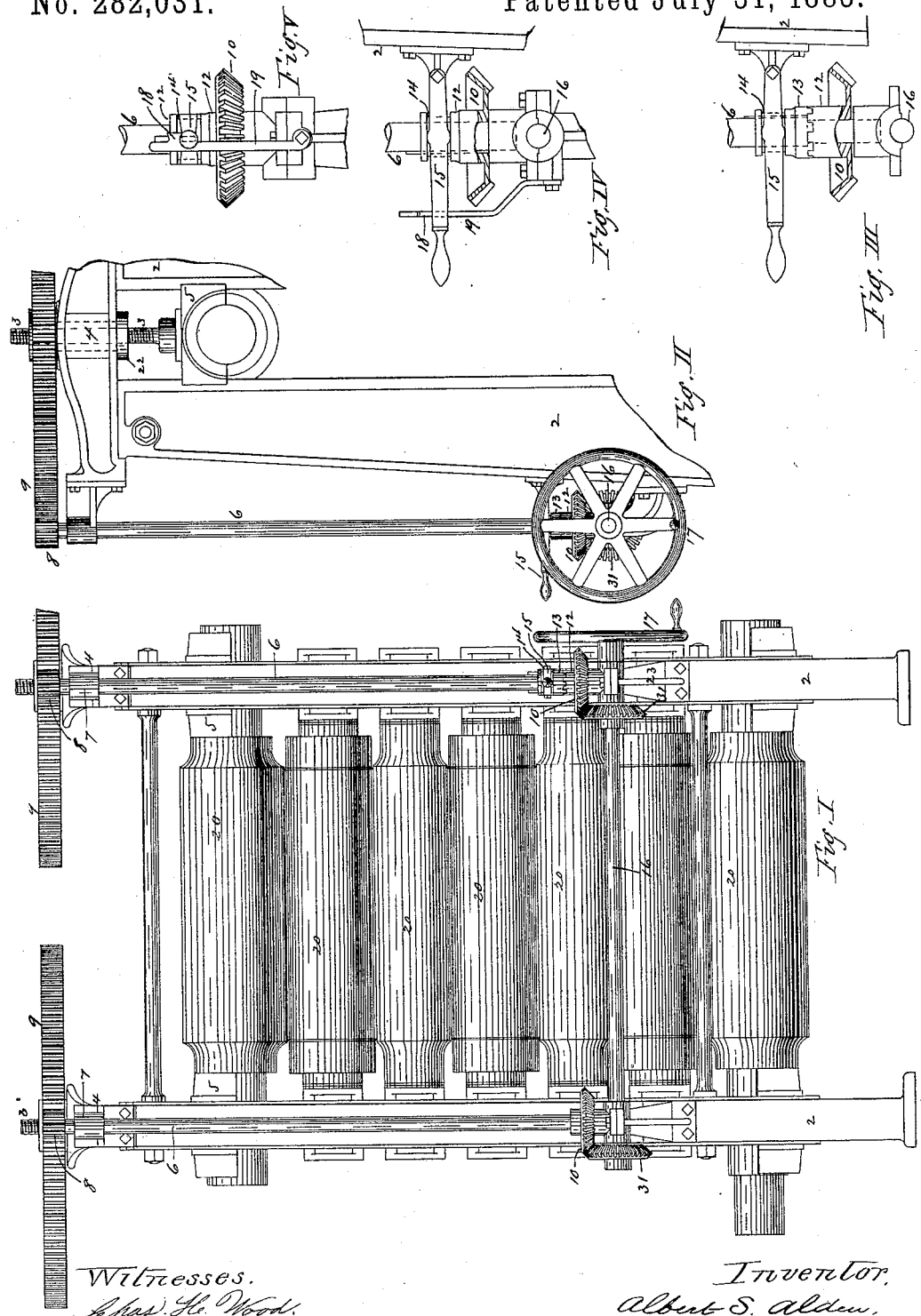

ALBERT S. ALDEN, OF HOLYOKE, MASSACHUSETTS, ASSIGNOR TO THE HOLYOKE MACHINE COMPANY, OF SAME PLACE.

PAPER-CALENDERING MACHINE.

SPECIFICATION forming part of Letters Patent No. 282,031, dated July 31, 1883.

Application filed May 9, 1883. (No model.)

*To all whom it may concern:*

Be it known that I, ALBERT S. ALDEN, of Holyoke, in the county of Hampden and State of Massachusetts, have invented a new and useful Improvement in Paper-Calendering Machines, of which the following is a specification and description.

The object of my invention is to provide a paper-calendering machine with mechanism whereby either end of the calender-rolls may be either raised or depressed at will by the operator without going from one side of the machine to the other; and I accomplish this by the mechanism substantially as hereinafter described, and illustrated in the accompanying drawings, in which—

Figure I is a front elevation of a paper-calendering machine having my invention applied thereto. Fig. II is a side elevation of so much of the machine as is necessary to show the invention. Fig. III is a side view of the clutch keyed to the upright shaft, the bevel-gear in section and made loose on the upright shaft, and the hand-lever for moving the clutch on the shaft. Fig. IV is a side view of a modification, showing the bevel-gear in section and keyed with its grooved hub to the upright shaft, and the hand-lever by which the gear is moved on the shaft or the upright shaft is disconnected from the gear of the horizontal shaft; and Fig. V is a front view of Fig. IV.

In the drawings, 2 represents the upright frame of a paper-calendering machine, in which the ordinary calender-rolls, 20, have their bearings, in whose cross-head 4, at the top of the machine, is inserted, from the lower side, a nut, 22, having an annular shoulder near its lower end, and this nut extends up through the cross-head, but so as to turn freely therein, and a large toothed wheel, 9, is secured fast to the upper end of each nut at each end of the machine above the cross-head. A screw, 3, whose lower end is secured to or made upon the cap 5, is inserted at its upper end into a threaded hole in the nut, from the lower side of the latter, and the toothed wheel and the nut secured thereto being turned, the latter is turned onto the screw until the screw is drawn up into its desired position. The calender-rolls 20 being then secured in place in their bearings in the frame, the toothed wheel 9 and nut 22 are turned, and the screw 3 and cap 5 are moved down until the latter bears upon the journal of the upper roll at each end of the machine. An upright shaft, 6—one at each end of the machine—has its bearings in suitable boxes, as 7, with a pinion, 8, secured to the upper end of each shaft to engage with each toothed wheel 9. A horizontal shaft, 16, has its bearings either in the uprights 2 or in suitable boxes or brackets secured thereto, with a bevel-gear, 31, secured to each end, to engage with a similar bevel-gear, 10, one of which, at one end of the machine, is secured fast to the lower end of its shaft 6; but the other gear may run loose on the lower end of its upright shaft, as shown in Fig. III, to engage with the bevel-gear secured at that end of the horizontal shaft to which the hand-wheel or winch 17 is secured. The hub 12 of this loose bevel-gear is provided with radial teeth at its upper end, and upon this shaft 6, and above the toothed hub 12, is placed a clutch or collar, 13, keyed to the shaft, so as to revolve therewith, but so as to slide up and down freely on said shaft. The lower end of this clutch or collar is provided with teeth to engage with the teeth on the upper end of the hub 12, and an annular groove, 14, is made in this clutch, with a hand-lever, 15, pivoted to the frame 2 and engaging with this groove, so that by moving the hand-lever upward the collar or clutch is moved upward, so that its teeth on the lower end will be disengaged from those on the upper end of the hub 12 of the gear 10. As soon as this disengagement occurs, this bevel-gear 10 at this end of the machine, being loose on its shaft 6 when the shaft 16 is revolved by its hand-wheel 17, may revolve without causing the shaft 6 to revolve with it, as the clutch 13 and shaft 6 are then not connected with the shaft 16; but if the hand-lever 15 is moved down to connect the clutch with the hub 12 of the bevel-gear 10, if the shaft 16 be revolved by the hand-wheel, both shafts 6 will be revolved by the action of the gears 31, one at each end of the horizontal shaft 16.

Suppose it is desired with this apparatus to cause a greater degree of pressure between the rolls 20 at the end of the machine opposite to that at which the hand-wheel is located. The hand-lever 15 is raised to disengage the clutch 13 from the hub of the gear 10 nearest the hand-wheel, and the shaft 16 is then turned with the hand-wheel to revolve the shaft 6 at the other end of the machine, and the pinion 8 and wheel 9 revolve the nut 22 to move down the screw 3 and cap 5 to the desired degree, and the hand-lever is then dropped. If it is desired to cause greater pressure between the rolls at the end of the machine nearest the hand-wheel 17, the hand-lever 15 is raised to disengage the clutch from the hub of the bevel-gear 10 nearest the hand-wheel, and the shaft 16 and upright shaft 6 at the end of the machine opposite the hand-wheel are turned, raising the screw 3 and cap 5 the desired amount, and the hand-lever is then moved down to engage the clutch 13 with the hub of the bevel-gear 10 near the hand-wheel and the shaft 16, and both shafts 6 are turned in the opposite direction to move down both screws 3 and caps 5 alike, and the pressure of the upper roll 20 upon the others will be greater at the end of the machine nearest the hand-wheel 17. In this manner any desired degree of pressure of the rolls at either end of the machine may be easily obtained, and the mechanism be operated by a person standing in one position, and the pressure of the rolls be adjusted with the greatest nicety, even in the very largest machines.

Instead of using a clutch, 12, separate from the bevel-gear 10, and lifting or moving the clutch with the hand-lever, I may lift or move the bevel-gear itself, in which case I make the same annular groove, 14, in the hub 12 of the gear 10, key the said gear itself to the shaft 6, and let the hand-lever 15 engage with the groove 14 in the hub of the gear, so that by lifting or moving the hand-lever in one direction the gear 10 will slide along the shaft 6 out of engagement with the bevel-gear 31, so that the latter, when revolved, will not revolve the gear 10 and shaft 6, which is thus disconnected. This modification is shown in Figs. IV and V, and produces the same result as with the use of the clutch 13. The advantage in the use of the clutch is that the latter is lighter and more easily moved than the gear itself, and when the clutch is in engagement with the gear it becomes practically a part of the gear itself, as through the gear a rotary motion is communicated to the shaft 6.

If desired, a latch, 19, pivoted at one end to the frame and provided with a projecting catch, 18, may be used to hold the hand-lever in either position into which it may be moved and prevent its being accidentally displaced, and when it is desired to move said lever the latch may be moved to one side.

The particular construction of the nut 22, cap 5, and screw 3 is not an essential feature of the invention, as the screw might turn in a threaded hole through the cross-head 4, and be keyed or secured to the toothed wheel in the same way, in which case the cross-head would form the nut to elevate and depress the screw.

It is evident that the hand-wheel may be attached to either or both ends of the shaft 16, and the bevel-gear 10 be made loose on the lower end of both shafts 6, with a hand-lever, 15, at each end of the machine, so that the operator may adjust the pressure at either end of the machine without departing from the invention in the least.

Having thus described my invention, what I claim as new is—

In a paper-calendering machine, the combination of the screw 3 and a toothed wheel, 9, secured thereto—one at each end of the machine—a nut to elevate or depress each screw, a shaft, 6, provided with a pinion, 8, at each end of the machine, to engage with said toothed wheel 9, a horizontal shaft, 16, provided with a bevel-gear, 31, at each end, and a hand-wheel or winch secured thereto, a bevel-gear, 10, on each shaft 6, and a hand-lever, 15, whereby both said shafts 6 and toothed wheels 9 may be rotated at the same time by turning the shaft 16, or only one of said shafts 6 be rotated and the other uncoupled from the shaft 16 and its gear by the movement of said hand-lever, substantially as described.

ALBERT S. ALDEN.

Witnesses:
T. A. CURTIS,
CHAS. H. WOOD.